United States Patent [19]
Carlisle et al.

[11] Patent Number: 5,469,747
[45] Date of Patent: Nov. 28, 1995

[54] SYSTEM AND METHOD OF USING CORIOLIS MASS FLOW RATE METER

[75] Inventors: Lonnie E. Carlisle, Canton; Chester M. Pesmark, Brighton, both of Mich.

[73] Assignee: Detroit Diesel Corporation, Detroit, Mich.

[21] Appl. No.: 184,659

[22] Filed: Jan. 21, 1994

[51] Int. Cl.⁶ ........................................ G01F 1/78
[52] U.S. Cl. ........................................ 73/861.37
[58] Field of Search ............ 73/113, 114, 118.1, 73/861.37, 861.38, 199, 861.04

[56] References Cited

U.S. PATENT DOCUMENTS

| | | |
|---|---|---|
| Re. 31,450 | 11/1983 | Smith . |
| 3,021,684 | 2/1962 | Berck ........................ 73/199 X |
| 4,141,240 | 2/1979 | Usui et al. . |
| 4,253,330 | 3/1981 | Kato . |
| 4,282,746 | 8/1981 | Henke et al. . |
| 4,479,465 | 10/1984 | Flynn . |
| 4,491,025 | 1/1985 | Smith et al. . |
| 5,205,161 | 4/1993 | Erwin . |
| 5,211,842 | 5/1993 | Tuss et al. ................ 73/861.04 X |

FOREIGN PATENT DOCUMENTS 4-339220  11/1992  Japan ................ 73/861.38

Primary Examiner—Richard Chilcot
Assistant Examiner—Elizabeth L. Dougherty
Attorney, Agent, or Firm—Brooks & Kushman

[57] ABSTRACT

An apparatus and method of measuring fluid flow using a Coriolis mass flow rate meter which includes a means for maintaining the outlet pressure of the Coriolis mass flow rate meter substantially above zero p.s.i.g., thereby substantially improving the measurement accuracy of the meter. The apparatus and method minimize the change in pressure across the Coriolis mass flow rate meter. The apparatus and method are used in a fuel measurement system in which the fuel pressure is monitored both upstream and downstream of the Coriolis mass flow rate meter. The apparatus and method are also used with a multi-engine fuel measurement system in which the outlet pressure of the Coriolis mass flow rate meter is monitored and maintained substantially above zero p.s.i.g.

7 Claims, 4 Drawing Sheets

SYSTEM AND METHOD OF USING CORIOLIS MASS FLOW RATE METER

TECHNICAL FIELD

This invention relates to the art of measuring mass flow rates of flowing substances, particularly to measuring fuel flow rates to an engine.

BACKGROUND OF THE INVENTION

Accurate fuel consumption measurement is very important in improving fuel efficiency in engine powered vehicles. Given the tightening of EPA fuel consumption standards, the need has become crucial for the most accurate fuel consumption measurements in all modes of operation including at idle.

The use of Coriolis mass flow rate meters has become fairly popular in measuring fuel flow rates in single engine or multi-engine fuel measurement systems. They have been used in natural gas systems, diesel systems and many other applications, and are considered very effective in measuring fuel flow rate in these different applications. These meters operate on the principle of flowing a fluid through an oscillating conduit, thereby producing forces perpendicular to both the velocity of the mass moving through the conduit and the angular velocity vector of the oscillation of the conduit. The magnitude of such forces is related to the mass flow rate as a function of the angular velocity of the conduit in that the meter has a vibrating U-shaped tube which twists under these forces an amount proportional to the mass flow rate of the fluid therethrough. However, the accuracy of these meters is drastically compromised at very low flow rates, such as at engine idle and near idle engine speeds, thereby precluding their use at this particular range of engine operation.

Therefore, it is desirable to develop a method of using Coriolis mass flow rate meters in a manner which would increase the measurement accuracy of the meter and allow its use at even the lowest fuel flow rates.

SUMMARY OF THE INVENTION

The present invention contemplates a method of measuring fluid flow using a Coriolis mass flow rate meter whereby the measurement accuracy is significantly increased, most dramatically at the lowest flow rates, by maintaining the pressure at the outlet of the meter above zero p.s.i.g.

The present invention further contemplates minimizing the change in the pressure from the inlet to the outlet of the meter in order to improve accuracy of the meter.

Another aspect of the present invention contemplates a Coriolis fluid flow measurement system having a fluid source means providing fluid at a pressure substantially above zero p.s.i.g. (pounds per square inch gauge), a fluid flow line for carrying the fluid from the fluid source, a Coriolis mass flow rate meter connected to the fluid flow line, and means for maintaining the fluid pressure at the meter outlet substantially above zero p.s.i.g.

The invention further contemplates a method of measuring fluid flow using a Coriolis mass flow rate meter, including the following steps: providing a fluid line connected to the meter; flowing a fluid through the fluid line; providing a first pressure regulator in the fluid line upstream of the Coriolis mass flow rate meter; monitoring the regulated pressure in the fluid line downstream of the first pressure regulator; venting any air bubbles from the fluid line downstream of the first pressure regulator; providing a second pressure regulator in the fluid line downstream of the Coriolis mass flow rate meter; monitoring the regulated pressure in the fluid line downstream of the second pressure regulator; minimizing the change in pressure across the meter; and maintaining the second pressure regulator above zero p.s.i.g.

Another aspect of the present invention contemplates a method of measuring fluid flow comprising the above described method particularly applied to measurement of fuel consumption in an internal combustion engine.

The invention further contemplates a fuel measurement system for an internal combustion engine utilizing the above described Coriolis fluid flow measurement system in the engine, thereby monitoring fuel consumption in the engine.

A further aspect of the present invention contemplates a method of measuring fluid flow using a Coriolis mass flow rate meter with a multi-engine fuel measurement system including the following steps: providing a primary fuel line connected to the Coriolis mass flow rate meter; supplying pressurized fuel to the primary fuel line upstream of the meter, the fuel having an initial pressure greater than zero; providing a first pressure regulator downstream of the meter; minimizing the change in pressure across the meter; maintaining the fuel pressure at the first pressure regulator greater than zero p.s.i.g.; connecting a plurality of secondary fuel lines to the primary fuel line downstream of the first pressure regulator in parallel arrangement, each secondary fuel line having an entry valve and a secondary pressure regulator; connecting each secondary fuel line to a respective one of the engines downstream of each secondary fuel line's respective secondary pressure regulator; and maintaining each secondary pressure regulator at a pressure less than or equal to the fuel pressure at the first pressure regulator and greater than zero p.s.i.g.

The invention also contemplates a multiple engine fuel measurement system. A fuel source provides fuel to the system at a pressure substantially above zero p.s.i.g. A primary fuel line carries fuel from the fuel source means. A Coriolis mass flow rate meter is connected to the primary fuel line. A filter is connected to the primary fuel line upstream of the Coriolis mass flow rate meter. A first pressure regulator is connected to the primary fuel line downstream of the Coriolis mass flow rate meter for maintaining the fuel pressure above zero p.s.i.g. A plurality of secondary fuel lines are arranged in parallel for carrying fuel to a respective one of the multiple engines. A plurality of selector valves are each connected to its respective secondary fuel line. A plurality of secondary pressure regulators are provided, each secondary pressure regulator connected to its respective secondary fuel line downstream of the respective selector valve for the respective secondary fuel line and upstream of the respective engine. Each of the secondary pressure regulators is set at a certain pressure to simulate that fuel pressure entering the respective engine. Also provided are a plurality of three-way valves, each three-way valve being connected to its respective secondary fuel line for supplying and venting fuel to and from the engine. Likewise, a pressure measurement device is connected to a respective secondary fuel line immediately adjacent and upstream of the three-way valve and a pressure relief valve is provided downstream of each three-way valve.

DETAILED DESCRIPTION OF THE INVENTION

Figure 1:
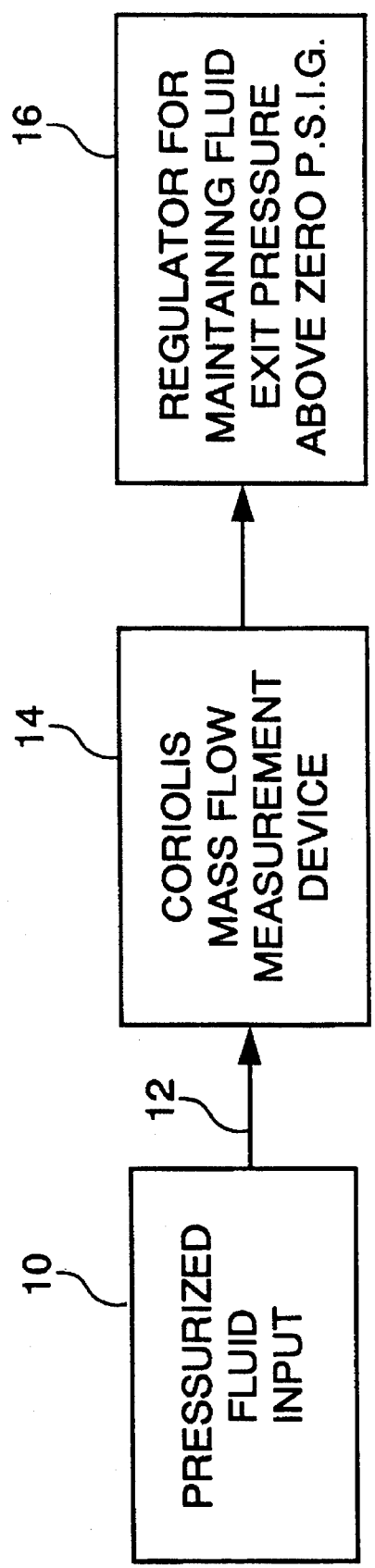
FIG. 1 is a flow chart of a Coriolis meter having regulated fluid pressure in accordance with the present invention.

Turning now to FIG. 1, a flow chart for a pressure regulated Coriolis mass flow rate meter is provided. The fluid line 12 carries fluid from the fluid supply 10 to the Coriolis mass flow rate meter 14. A pressure regulator 16 is connected to the fluid line 12 downstream of the Coriolis mass flow rate meter 14 to regulate outlet pressure at the meter 14. The regulator 16 maintains the outlet pressure at the meter 14 substantially above zero p.s.i.g. By keeping the outlet pressure at the meter 14 substantially above zero p.s.i.g., the measurement accuracy of the meter 14 is greatly enhanced.

Figure 2:
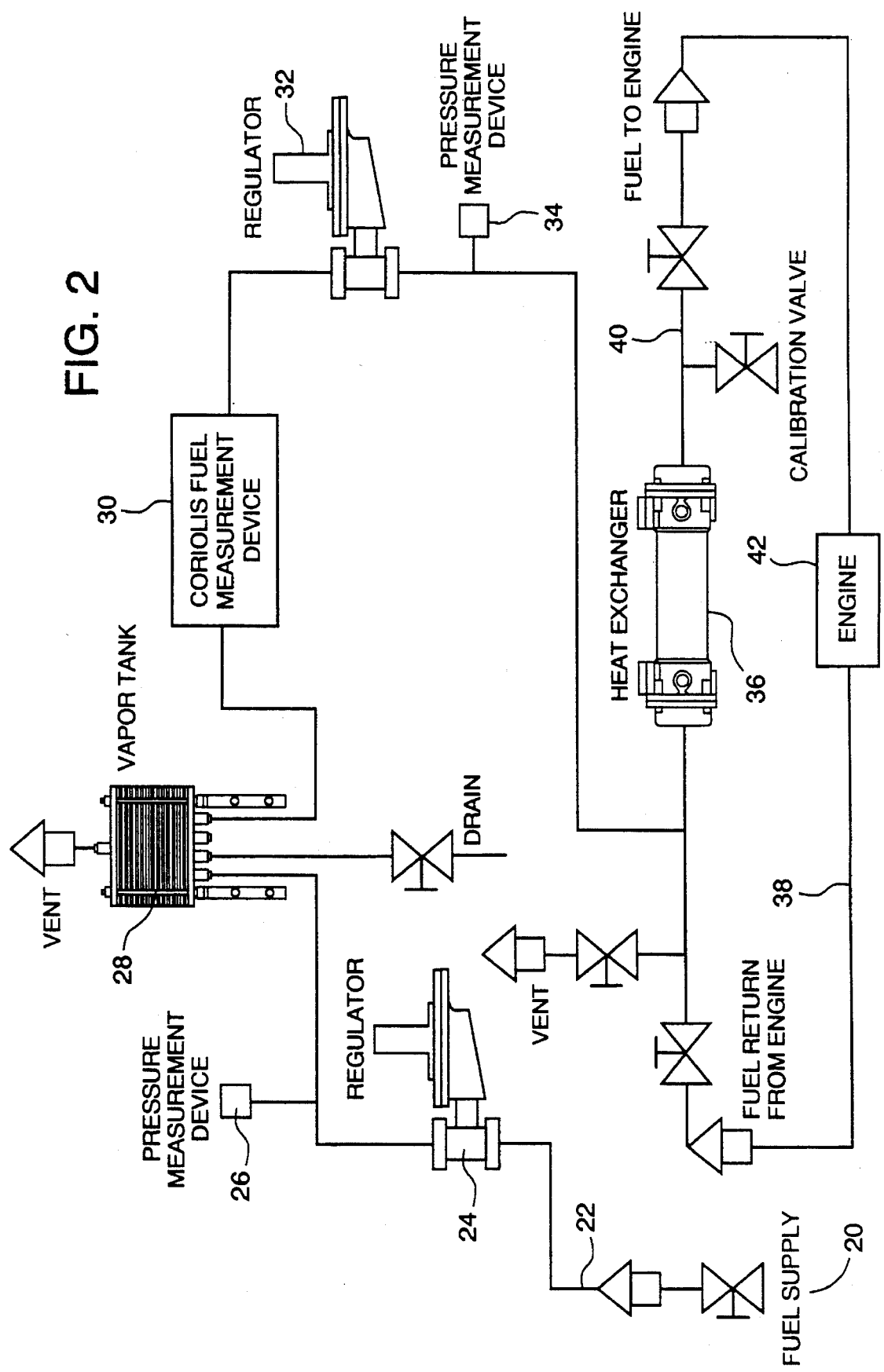
FIG. 2 is a flow chart of a fuel measurement system for an engine in accordance with the present invention.

FIG. 2 is a flow chart for a Coriolis fuel measurement system. The first fuel line 22 carries fuel from the fuel supply 20 to the Coriolis mass flow rate meter 30. A first pressure regulator 24 is provided to regulate the supplied fuel pressure. A first pressure measurement device 26 is connected to the fuel line 22 downstream of the first pressure regulator 24 to monitor the regulated pressure. A vapor tank 28 is connected to the fuel line 22 downstream of the first pressure measurement device 26. The vapor tank 28 vents any air bubbles that may be in the supplied fuel. The Coriolis meter 30 measures the mass fuel rate of the fuel flowing through the first fuel line 22. A second pressure regulator 32 is connected to the first fuel line 22 downstream of the Coriolis meter 30. The second pressure regulator 32 maintains the fuel pressure substantially above zero p.s.i.g. at the outlet of the Coriolis meter 30. For example, in measuring fuel consumption of medium and heavy duty diesel engines, a pressure of 5 p.s.i.g. is maintained. Any pressure above zero is satisfactory, but at pressures of 5 p.s.i.g. one can be assured that in practice no fluctuations in line pressure at the downstream end of the flow meter will adversely affect the measurement. The first pressure regulator 24 and second pressure regulator 32 work together to maintain a substantially constant pressure across the Coriolis meter 30. A second pressure measurement device 34 is connected to the first fuel line 22 downstream of the second pressure regulator 32. The second pressure measurement device 34 monitors the regulated pressure to the engine 42.

Fuel return line 38 carries unburned fuel from the engine 42 to the first fuel line 22 downstream of the second pressure measurement device 24. Fuel return line 38 and first fuel line 22 join together into second fuel line 40 downstream of the second pressure measurement device 34. Second fuel line 40 carries the fuel through a heat exchanger 36. The heat exchanger 36 is used to maintain a selected temperature of the fuel going to the engine 42.

Figure 3:
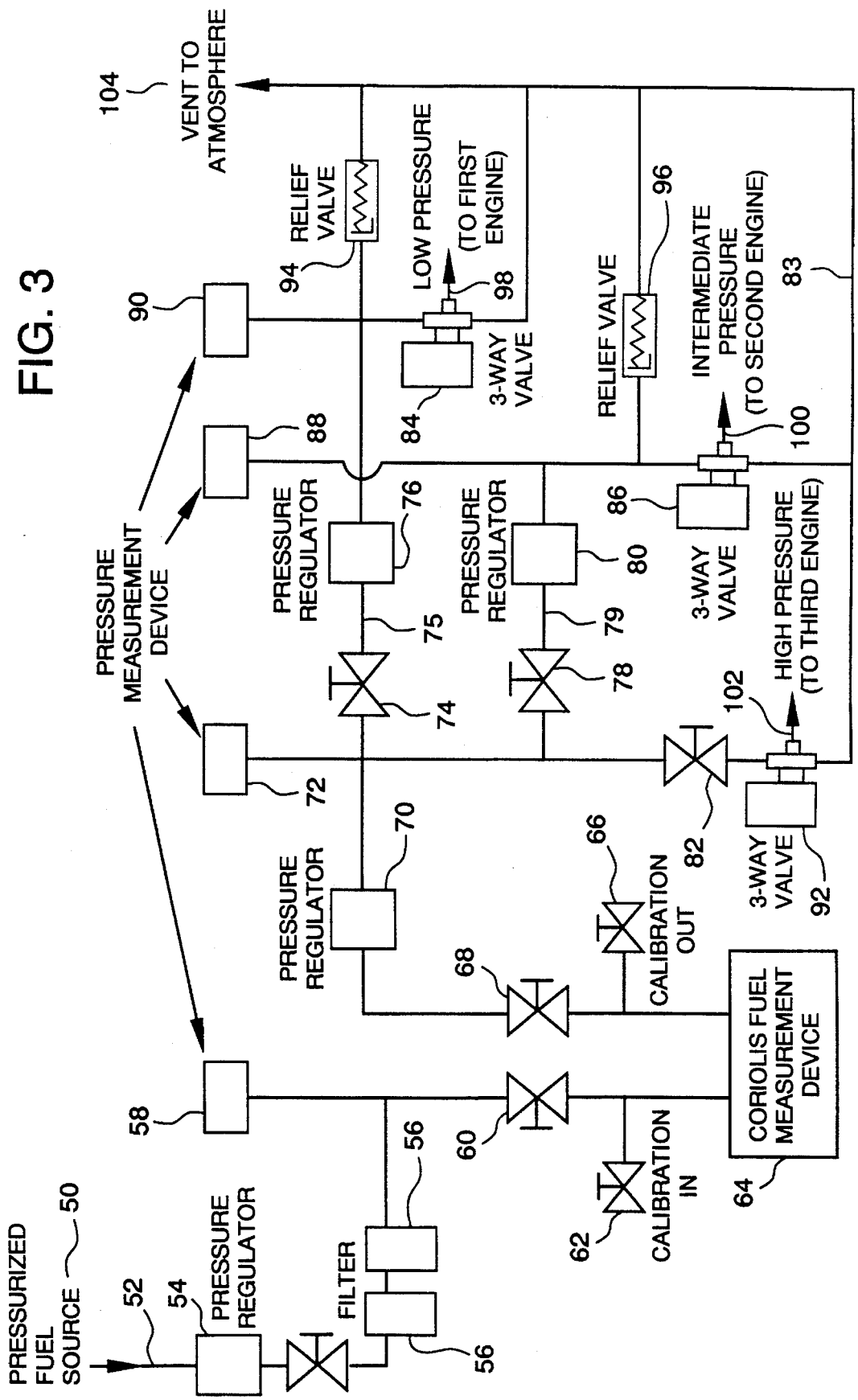
FIG. 3 is a flow chart for a multi-engine fuel measurement system in accordance with the present invention.

FIG. 3 shows a flow chart for a multi-engine fuel measurement system for compressed natural gas. A first fuel line 52 carries fuel from a pressurized fuel source 50 to a Coriolis mass flow rate meter 64. A first pressure regulator 54 is optional for regulating the pressure of the fuel from the pressurized fuel source 50. Downstream of the first pressure regulator 54 is a pair of filters 56 which separate any impurities from the supplied fuel. A first pressure measurement device 58 is connected to the first fuel line 52 downstream of the filters 56. The first pressure measurement device 58 monitors the pressure in the first fuel line 52. First system valve 60 is connected to the first fuel line 52 downstream of the first pressure measurement device 58. A calibration "in" valve 62 is provided downstream of the first system valve 60. A calibration "out" valve 66 is connected to the first fuel line 52 downstream of the Coriolis meter 64. A second system valve 68 is connected to the first fuel line downstream of the calibration "out" valve 66. During calibration of the Coriolis meter 64, the system valves 60, 68 are closed, and the calibration valves 62, 66 are open. A second pressure regulator 70 is connected to the first fuel line downstream of the second system valve 68. The second pressure regulator 70 is used to simulate any variation of vehicle tank pressures from fuel supply 50. The second pressure regulator 70 maintains the output pressure of the Coriolis meter 64 at a pressure substantially above zero p.s.i.g. The first pressure regulator 54 and the second pressure regulator 70 may be used to maintain a minimum change in pressure across the Coriolis meter 64. A second pressure measurement device 72 is located downstream of the second pressure regulator 70 in order to monitor the pressure at the second pressure regulator 70.

Downstream of the second pressure measurement device 72, the first fuel line 52 splits into three separate lines; a second fuel line 75, a third fuel line 79 and a fourth fuel line 83. Connected to the second fuel line 75 is a first selector valve 74. When the first selector valve 74 is open, fuel flows through the second fuel line 75. Downstream of the first selector valve 74 is a third pressure regulator 76 and a fourth pressure measurement device 90. The fourth pressure measurement device 90 monitors the pressure in the third pressure regulator 76. This pressure may be set for a particular desired test pressure condition for a first engine. Downstream of the fourth pressure measurement device 90 are a first relief valve 94 and a first three-way valve 84, arranged in parallel. The first three-way valve 84 is used to supply or vent the gas to and from the first engine. The first relief valve 94 is used to vent high pressure in case of the failure of the first pressure regulator 76. The first engine is connected to the first three-way valve 84 via line 98.

The third fuel line 79 has a second selector valve 78 connected thereto. A fourth pressure regulator 80 is connected to the third fuel line 79 downstream of the second selector valve 78. The fourth pressure regulator 80 may be set at a desired pressure for testing of a second engine. A third pressure measurement device 88 is connected to the third fuel line 79 downstream of the fourth pressure regulator 80 to monitor the pressure in the third fuel line 79. Downstream of the third pressure measurement device 88, a second relief valve 96 and a second three-way valve 86 are arranged in parallel. The second three-way valve 86 is connected to the second engine via line 100. The second three-way valve 86 is used to supply or vent the fuel to or from the engine. The second relief valve 96 is used to vent high pressure in case of failure of the fourth pressure regulator 80. The fourth fuel line 83 carries fuel from the first fuel line 52 to a third engine. A third selector valve 82 is connected to the fourth fuel line 83. A third three way valve 92 is connected to the fourth fuel line 83 downstream of the third selector valve 82. The third three way valve 92 is used to supply or vent the fuel to and from the third engine via line 102. In this configuration, the third engine is operating at the same pressure as the second pressure regulator 70.

Downstream of the first, second and third three-way valves 84, 86, 92, the second fuel line 75, the third fuel line 79 and the fourth fuel line 83 join together and lead the fuel to a vent 104.

In operation, while running the engine (whether it be the first, second or third engine or any combination thereof) the pressure at both ends of the Coriolis flow measurement device 64 is equal to the pressure of the pressurized fuel source 50 initially, and is constantly monitored. This pressure setting may vary depending upon the application. However, this pressure will always be maintained above zero p.s.i.g.

Figure 4:
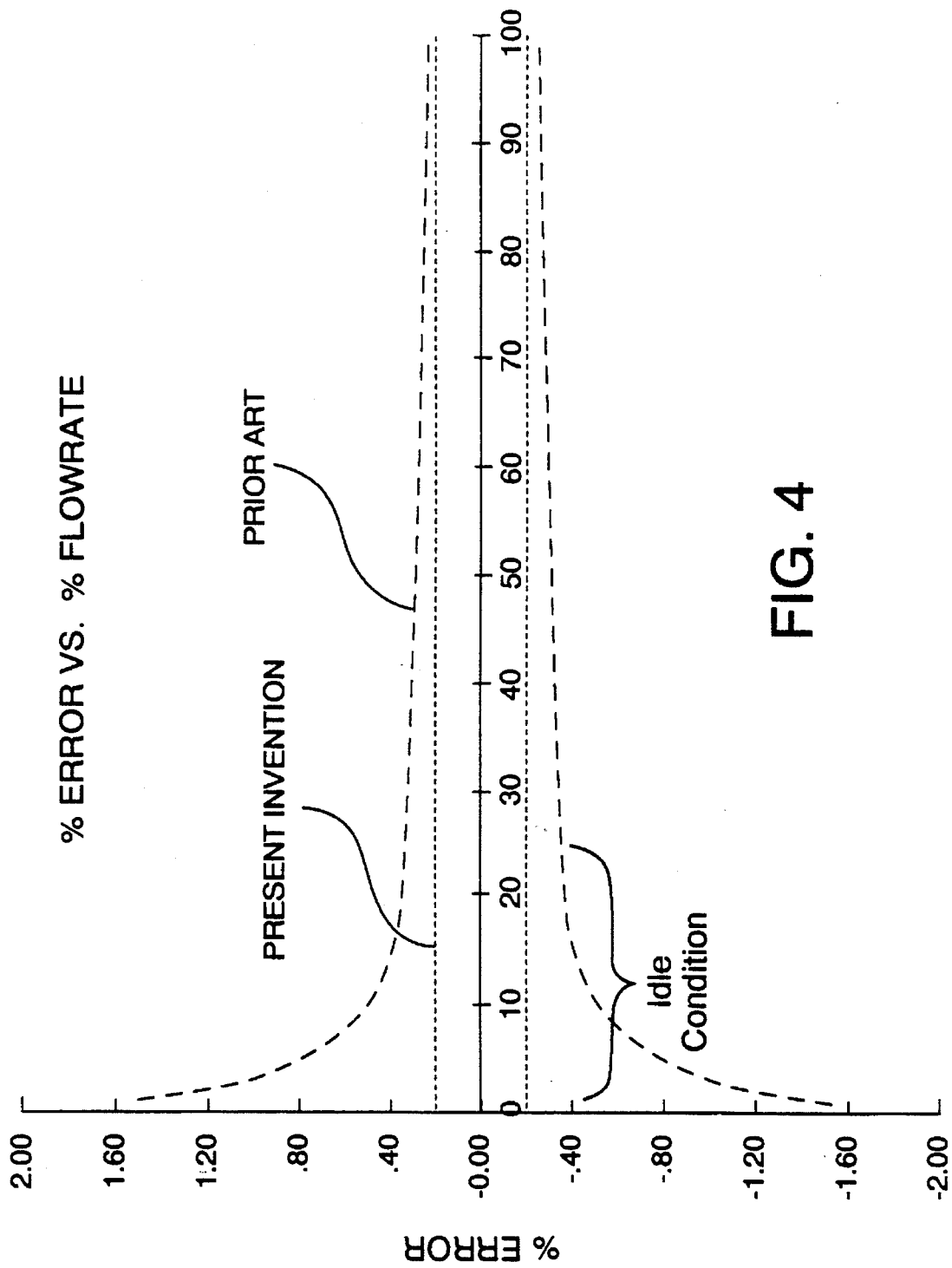
FIG. 4 is a graphical representation of the accuracy of the present invention in comparison with the standard error of a Coriolis mass flow rate meter as utilized in accordance with conventional practice.

The benefit of maintaining a positive pressure at all times at the meter outlet is illustrated in FIG. 4. FIG. 4 shows that the present invention improves the accuracy of flow measurement over the prior art from 0.4% to 0.2% at high flow rates. FIG. 4 also shows a drastic improvement in measurement accuracy at low flow rates, particularly at idle engine conditions. The present invention is able to maintain the rate of measurement error at 0.2%, even at idle engine conditions.

Now that the preferred embodiments of the present invention have been shown and described in detail, various modifications and improvements thereon will become readily apparent to those skilled in the art. Accordingly, the spirit and scope of the present invention is to be limited only by the appended claims and not by the foregoing specification.

We claim:

1. A method of measuring fluid flow using a Coriolis mass flow rate meter which comprises a vibrating U-shaped tube which twists an amount proportional to the mass flow rate of the fluid therethrough according to Newton's Second Law of Motion, the meter having an inlet and an outlet, comprising:

flowing a fluid through the meter;

maintaining the pressure at the outlet of the meter above zero p.s.i.g.; and minimizing the change in pressure from the inlet to the outlet of the meter.

2. The method of claim 1 wherein the pressure across the meter is maintained substantially constant throughout any fluid flow measurement period at about at least 5 psig.

3. A method of measuring fluid flow using a Coriolis mass flow rate meter comprising:

providing a fluid line connected to the Coriolis mass flow rate meter;

flowing a fluid through the fluid line;

providing a first pressure regulator in the fluid line upstream of the Coriolis mass flow rate meter;

monitoring the regulated pressure in the fluid line downstream of the first pressure regulator;

venting any air bubbles from the fluid line downstream of the first pressure regulator;

providing a second pressure regulator in the fluid line downstream of the Coriolis mass flow rate meter;

monitoring the regulated pressure in the fluid line downstream of the second pressure regulator;

minimizing the change in pressure across the meter; and maintaining the second pressure regulator above zero p.s.i.g.

4. A fuel measurement system for an engine comprising:

a primary fuel line for carrying fuel;

a first pressure regulator connected to the primary fuel line for regulating the fuel pressure;

a first pressure measurement device connected to the primary fuel line downstream of first pressure regulator;

a vapor tank connected to the primary fuel line downstream of the first pressure measurement device for venting air bubbles from the fuel line;

a Coriolis fuel measurement meter connected to the primary fuel line downstream of the vapor tank;

a second pressure regulator connected to the primary fuel line downstream of the Coriolis mass flow rate meter for maintaining the fuel at a pressure greater than zero p.s.i.g. and substantially equal to the fuel pressure at the first pressure regulator; and a second pressure measurement device connected to the primary fuel line downstream of the second pressure regulator.

5. The fuel measurement system for an engine of claim 4 further comprising:

a fuel return line which carries unburned fuel from the engine, the fuel return line having a vent and being connected to the primary fuel line downstream of the second pressure measurement device;

a secondary fuel line which carries fuel from fuel return line and the primary fuel line to the engine;

a heat exchanger connected to the secondary fuel line; and a calibration valve connected to the secondary fuel line downstream of the heat exchanger.

6. A method of measuring fluid flow using a Coriolis mass flow rate meter with a multi-engine fuel measurement system comprising:

providing a primary fuel line connected to the Coriolis mass flow rate meter;

supplying pressurized fuel to the primary fuel line upstream of the meter, the fuel having an initial pressure greater than zero p.s.i.g.;

providing a first pressure regulator downstream of the meter;

minimizing the change in pressure across the meter;

connecting a plurality of secondary fuel lines to the primary fuel line downstream of the first pressure regulator in parallel arrangement, each secondary fuel line having an entry valve and a secondary pressure regulator;

connecting each secondary fuel line to an engine downstream of each secondary fuel line's respective secondary pressure regulator; and maintaining each secondary pressure regulator at a pressure less than or equal to the fuel pressure at the first pressure regulator and greater than zero p.s.i.g.

7. A multiple-engine fuel measurement system comprising:

a fuel source means providing fuel at a pressure substantially above zero p.s.i.g.;

a primary fuel line for carrying fuel from the fuel source means;

a Coriolis mass flow rate meter connected to the primary fuel line;

a filter connected to the primary fuel line upstream of the Coriolis mass flow rate meter;

a first pressure regulator connected to the primary fuel line downstream of the Coriolis mass flow rate meter for maintaining the fuel pressure above zero p.s.i.g.;

a plurality of secondary fuel lines arranged in parallel for carrying fuel to each of the multiple engines;

a plurality of selector valves, each selector valve connected to its respective secondary fuel line;

a plurality of secondary pressure regulators, each secondary pressure regulator connected to its respective secondary fuel line downstream of the respective selector valve for the respective secondary fuel line and upstream of the respective engine, each of the secondary pressure regulators being set at a certain pressure to simulate that fuel pressure entering the respective engine;

a plurality of three-way valves, each three-way valve connected to its respective secondary fuel line for supplying and venting fuel to and from the respective engine;

a plurality of pressure measurement devices, each device connected to its respective secondary fuel line immediately adjacent and upstream of its respective three-way valve; and a pressure relief valve downstream of the plurality of three-way valves.

* * * * *